Dec. 8, 1936.  J. J. DE LA ROZA, SR  2,063,368

PACKING GLAND

Filed Jan. 21, 1935  2 Sheets-Sheet 1

INVENTOR.
Joaquin Julio de la Roza Sr.
BY Thos. E. Scofield
ATTORNEYS.

Dec. 8, 1936. J. J. DE LA ROZA, SR 2,063,368
PACKING GLAND
Filed Jan. 21, 1935  2 Sheets—Sheet 2
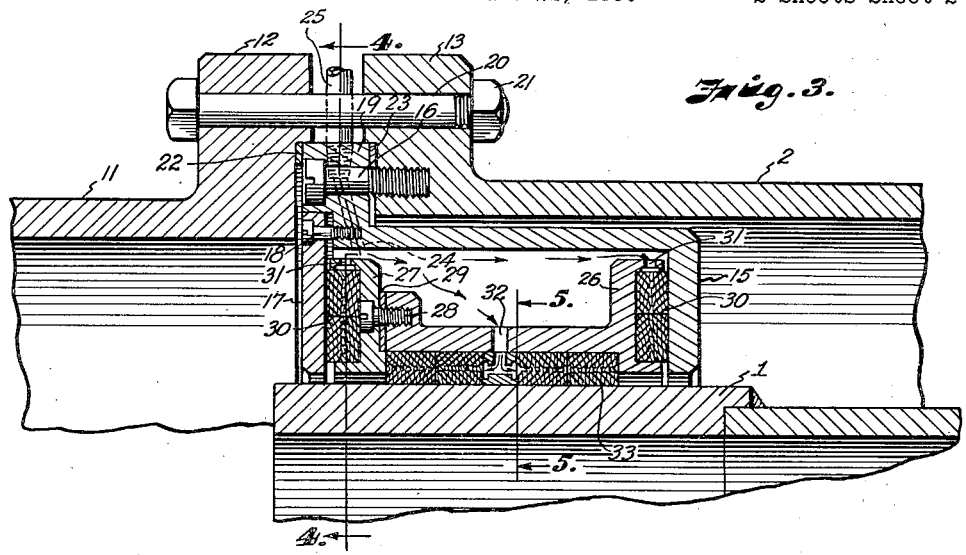
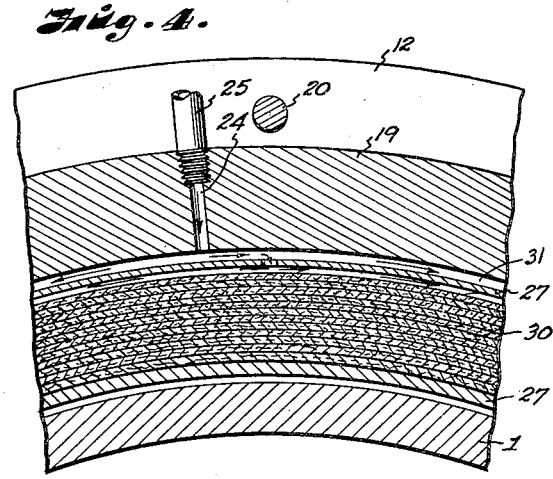
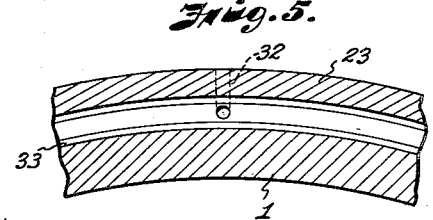
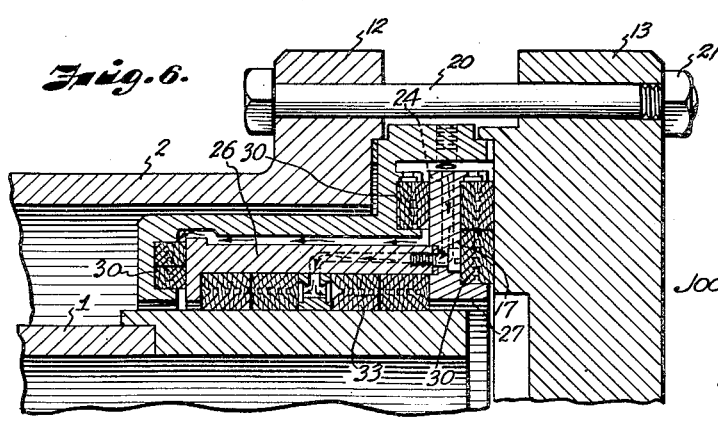
INVENTOR.
Joaquin Julio de la Roza Sr.
By Thos. F. Deofield
ATTORNEY.

Patented Dec. 8, 1936

2,063,368

UNITED STATES PATENT OFFICE 2,063,368

PACKING GLAND

Joaquin Julio de la Roza, Sr., Great Neck, N. Y., assignor to de la Roza Corporation, Wilmington, Del., a corporation of Delaware Application January 21, 1935, Serial No. 2,724

6 Claims. (Cl. 285—9)

This invention relates to a floating gland and more particularly to means for packing a large hollow cylinder, rotating within another hollow cylinder.

In the conventional type of gland or packing, it has been customary to provide a gland for a rotating member in which the flexibility of packing takes care of any minor eccentricity which may exist. When rotating members of large diameter are employed, as for example in digesting apparatus for digesting cellulose material in which a rotating shell is housed within a cylinder, the flexibility of the packing cannot compensate for eccentricities or other irregularities which may exist. If this is attempted, excessive wear of the packing will take place and increased power to rotate the cylinder will be necessary, due to friction.

One object of this invention is to provide a compound in which the packing containing part of the gland, is allowed to float to take care of eccentricities or other irregularities.

In the accompanying drawings which form part of the instant specification and are to be read in conjunction therewith and in which like reference numerals are used to indicate like parts in the various views;

Figure 3 is an enlarged sectional view of the floating gland of the instant invention, showing one form thereof.

Figure 4 is a sectional view taken along the line 4—4 of Figure 3.

Figure 5 is a sectional view taken along the line 5—5 of Figure 3.

Figure 6 is an enlarged sectional view of a modification showing another form of carrying out the invention.

One object of this invention is to provide a novel gland structure for a rotating cylinder surface which will compensate for eccentricities and other irregularities.

Another object of this invention is to provide a packing structure for sealing a large rotating surface in an expeditious and efficient manner.

Other and further objects of this invention will appear from the following description.

Figure 1:
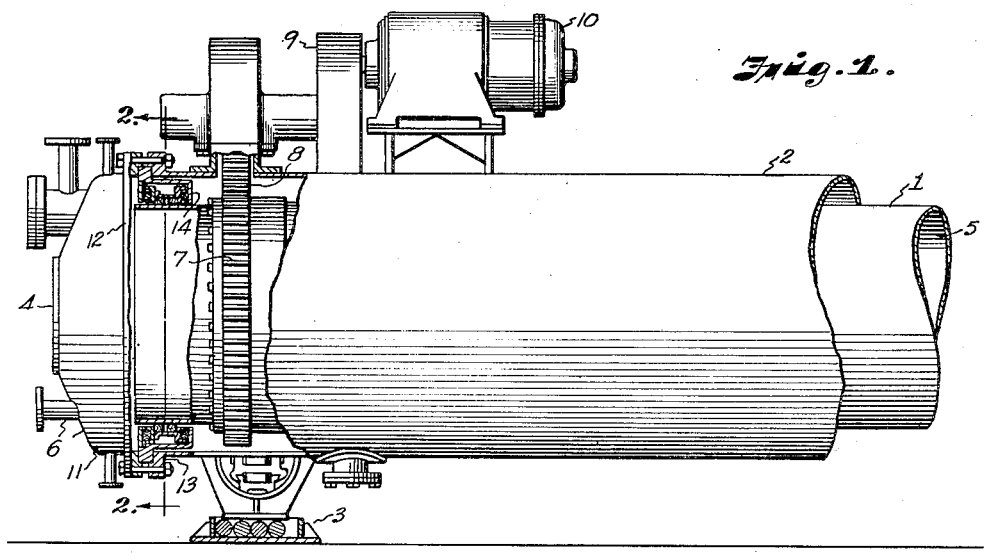
Figure 1 is a fragmentary view of a digester fitted with one form of carrying out the instant invention.
Figure 2:
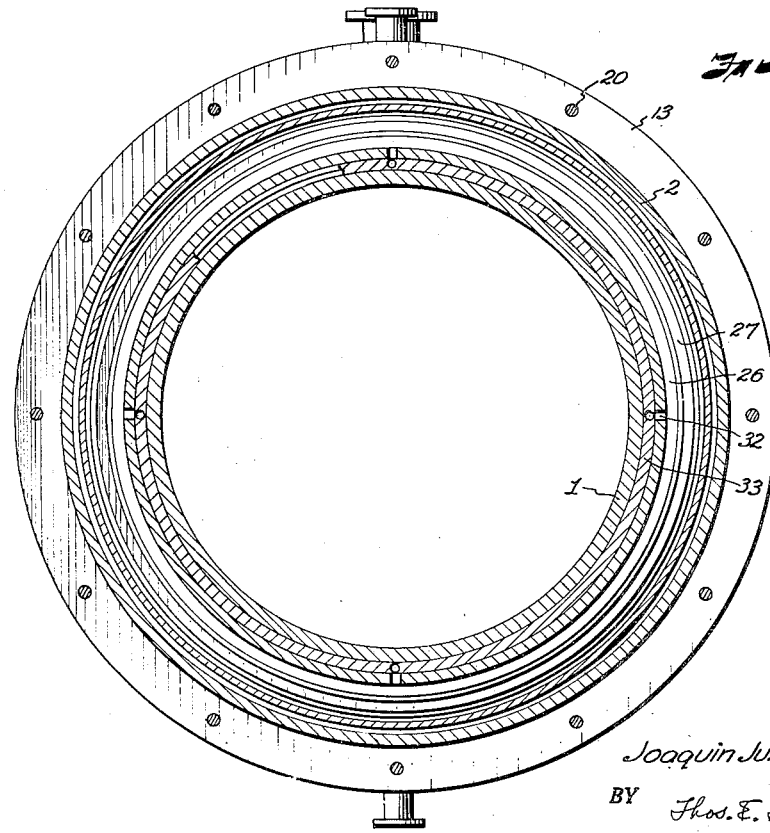
Figure 2 is a sectional view taken along the line 2—2 of Figure 1.

More particularly referring now to the drawings, it will be seen by reference to Figure 1 that a rotating cylinder 1, which is housed within a stationary cylindrical casing 2, is suitably mounted on rollers on a base 3. Figure 1 is a fragmentary view of a digesting apparatus into which wood or other cellulose-bearing or similar material is introduced through opening 4 to the interior 5 of the rotating cylinder 1. Digesting liquor is introduced through connection 6. The external surface of cylinder 1 has secured thereto an annular gear 7 which engages the pinion 8, which is driven through a suitable transmission housed in casing 9, by motor 10. It will be observed that cylinder 1 rotates within stationary cylinder 2. The inlet opening 4 is formed in a head 11 which is provided with a flange 12. The stationary cylinder 2 is provided with a flange 13. The gland assembly is generally indicated in Figure 1 by the reference numeral 14. It is this gland assembly which forms the subject matter of the instant invention.

Referring now to Figure 3 which is an enlarged view of the gland assembly, it will be seen that an annular ring 15 having a modified Z cross section is secured to flange 13 by stud screws 16. An annular ring 17 is secured to the ring 15 by smaller stud screws 18, thus forming an annular U-shaped trough. One leg 19 of the ring 15 through which the stud screws 16 extend is clamped between flanges 12 and 13 by means of bolts 20 and nuts 21. Suitable packing rings 22 and 23 are interposed between the lateral surfaces of the leg 19 and the interior surfaces of flanges 12 and 13. The leg 19 is provided with a duct 24 which communicates with a steam pipe 25. The duct 24 provides communication to beneath the web of the ring 15 as can readily be seen by reference to Figure 3. Positioned within the built-up channel member formed by rings 15 and 17 is a built-up floating ring formed by members 26 and 27. The built-up floating ring, it will be seen, has generally an H-shaped cross section. The member 27 is secured to member 26 by means of stud screws 28. Packing 29 is disposed between the adjacent surfaces of members 26 and 27. The lateral surfaces of the H-shaped member are provided with grooves in which are disposed rings 30 of packing. The upper lips of the grooves in which the packing rings 30 are disposed are provided with openings 31. The web of member 26 is provided with a duct 32 communicating with a channel formed by members 26 and 27 in which channel is disposed packing rings 33, as can readily be seen by reference to Figure 3. The surfaces of the members 15 and 17 facing packing 30 may be made flat as is shown in Figure 3, or at an angle to the axis of the inner cylinder, or may be made with a curve conforming to the radius of eccentricity of the cylinder.

It will be seen readily from the drawings, and the above description that, when steam is supplied to pipe 25, the steam will find its way to the top of packing rings 30 through openings 31, thus compressing packing 30. Likewise, steam will find its way through opening 32, whence it is led to a space between the packing members 33, exerting a lateral thrust tending to expand the packing members, thus assuring a tight joint. It will be seen that the packing is along two axes at right angles to each other and that the entire gland is adapted to float in a direction at right angles to the longitudinal axis of the cylinder 1. Usually I prefer to have the packing 33 which lies parallel to the axis of rotation of the cylinder 1 compressed more than the packing 30 so that much greater effort is required to turn the cylinder 1 against the resistance offered by the packing 33 than is required to turn the built-up floating ring formed by members 26 and 27 and the packing 30 placed at right angles to the longitudinal axis of the cylinder against the resistance offered by the surfaces of the members 15 and 17. This will cause the sliding to take place between the surfaces of the members 15 and 17 and the packing 30, rather than between the surface of the cylinder 1 and the packing 33. The inner cylinder 1 would slide on packing 33 when contracting or expanding with heat but not after that. This may be useful in many other arts than the pulp art when it is desired to have the sliding take place at an angle to the axis of the rotating member rather than parallel to it, as is done today.

Figure 6 represents a modification which enables the gland to be installed in a smaller space radially. It will be noted that the clearance between the stationary cylinder 2 and the rotating cylinder 1 is smaller in Figure 6 than in Figure 3, but that the construction embodies the same principles, namely, that the packing members 33 are supported and housed within member 26 which is itself packed by packing members 30 and which is adapted to float to accommodate for eccentricities and other irregularities.

If desired, the packing rings 33 and the members 26 and 27 may be made in several segments.

It will be seen that the objects of the invention have been accomplished. A floating gland or compound stuffing box has been provided, enabling it to rotate more freely, while allowing for irregularities or eccentricities incident to its rotation.

It will be understood that certain features and sub-combinations are of utility and may be employed without reference to other features and sub-combinations. This is contemplated by and is within the scope of the claims. It is further obvious that various changes may be made in details within the scope of the claims without departing from the spirit of the invention. It is, therefore, to be understood that the invention is not to be limited to the specific details shown and described.

Having thus described my invention, what I claim is:

1. In combination with a moving part, a casing spaced from and jacketing said part throughout its length, packing contacting said part, movable means for supporting said packing, stationary means between said casing and said moving part for housing said movable means, and packing means between said stationary and movable means.

2. In a gland, an annular channel, a single rigid annular channel housed within said first mentioned channel, packing carried by said second channel and means for introducing fluid under pressure between said channels.

3. In a gland, a channel, a second channel completely housed within said channel, and packing carried by said second channel, said packing being disposed in intersecting planes.

4. In a gland, an annular channel, a single rigid annular channel housed within said first mentioned channel, packing rings carried by said second channel, and means for introducing fluid under pressure between said channels and between said packing rings.

5. In combination with an annular moving part, an annular packing contacting said part, annular means rotatable with respect to said moving part for supporting said packing, stationary means for housing said rotatable means and packing means between said stationary and rotatable means, the packing between the moving part and rotatable means being compressed more than the packing between the stationary means and the rotatable means.

6. The combination of claim 5, the plane of the packing between the moving part and the rotatable means being parallel to the longitudinal axis of the moving part and being intersected by the plane of the packing between the stationary means and the rotatable means.

JOAQUIN JULIO DE LA ROZA, Sr.